July 1, 1930.    M. F. TREVIÑO    1,768,808
CONNECTING ROD
Filed July 10, 1928
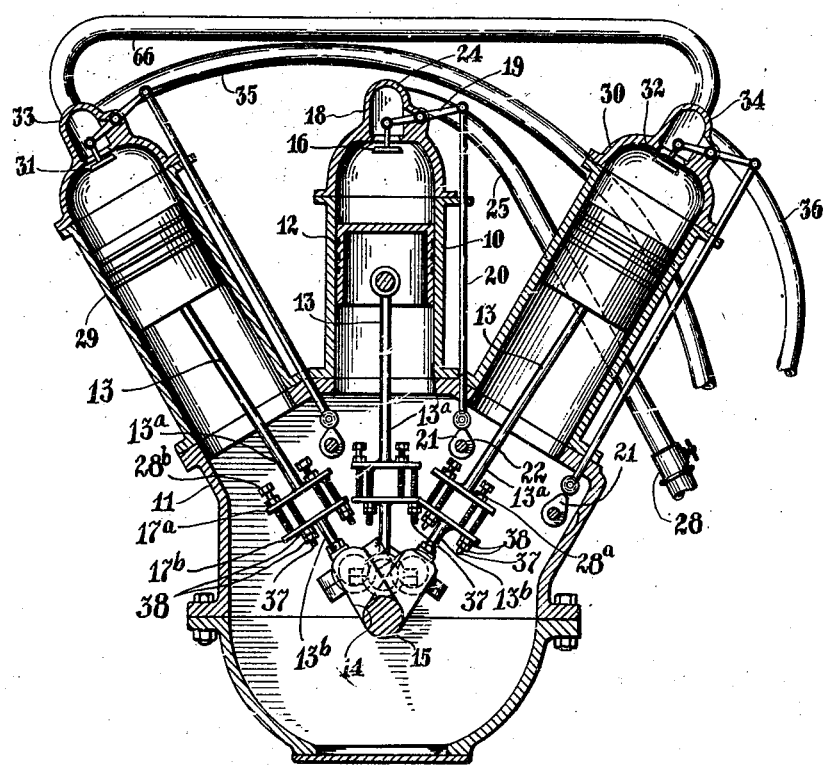
INVENTOR
BY Manuel Falcon Treviño
ATTORNEY Patented July 1, 1930

1,768,808

UNITED STATES PATENT OFFICE

MANUEL FALCON TREVIÑO, OF PIEDRAS, NEGRAS, MEXICO

CONNECTING ROD

Application filed July 10, 1928. Serial No. 291,634.

This invention relates to a new and useful device in the nature of a connecting rod for a compressed air motor especially adapted for the propulsion of aeroplanes, hydroplanes, dirigibles and the like, all types of flying machines of the lighter or heavier than air types such as commonly used for flying purposes.

An object of the invention is the provision of a connecting rod for a motor of the class described and for the purpose described of novel construction and arrangement of parts.

The figure on the drawing shows a sectional view of a motor having connecting rods constructed according to this invention.

As here embodied my improved compressed air motor comprises a plurality of cylinders 10, vertically disposed from crank case 11, and arranged or positioned in a vertical row or column. Pistons 12 are slidably mounted in the cylinders 10 and are connected by means of the connecting rods 13 to the crank pins 14 of the crank shaft 15 rotatively mounted in the crank case 11.

The cylinders 10 are provided with suitable valves 16, suitably positioned in the heads 18 of the said cylinders 10, and operatively connected by means of rock arms 19, and the pull rods 20 to the cams 21, mounted on the cam shaft 22, rotatively mounted in the crank case 11 and adapted for connection with a gear mounted on the crank shaft 15 as is conventional. The cylinders 10 are provided with a chamber 24, connected by means of a tubular member 25 to a compressed air supply tank not shown.

The above described construction is such as will permit at atmospheric pressure to be exhausted from the cylinders 10 by the exhaust stroke of the piston 12 which are driven by compressed air supplied from the tank provided for this purpose. A regulating valve 28 is interposed in the tubular member 25, as a means of cutting the compressed air supply when desired.

A plurality of cylinders 29 and 30, of equal number to the above mentioned cylinders 10, are angularly disposed from the crank case 11 and are positioned at either side of the cylinders 10 and are arranged in rows or columns. The cylinders 29 and 30 are provided with similar working elements as above described under the cylinders 10.

Valves 31 and 32 are positioned in the chambers 33 and 34 of the cylinders 29 and 30, and are connected by means of the tubular members 35 and 36 to a compressed air supply tank not shown. The valves 31 and 32 are similarly connected as described under the valves of the cylinders 10.

The above described construction is such as will permit the compressed air in the supply tank to rotate the crank shaft 15. as a means of driving or rotating a propeller, such as usually employed to propel airplanes and the like. This arrangement is common in all compressed air motors.

Departure therefrom resides in that the rods 13 are each of separate sections namely 13$^a$ and 13$^b$ which are provided with adjacent flanges 17$^a$ and 17$^b$. The flanges 17$^a$ are provided with studs 37 projecting thru apertures in the flanges 17$^b$, and lock nuts 38 on the studs limit the spaced position of the flanges. Screws 37 threadedly pass thru the flanges 17$^a$ and abut the flanges 17$^b$ for urging the flanges into spaced relation as determined by the nuts 38. Lock nuts 28$^a$ are engaged on the bolts 28$^b$. This arranges the flanges to be differently spaced for changing the lengths of the rods 13 for changing the relative position of the pistons and the cylinders so that when the portions of the cylinders become excessively worn the pistons may be moved therefrom.

Having thus described my invention what I claim as new and desire to secure by United States Letters Patent is:—

1. In a device of the class described, a piston rod consisting of two aligned sections, a flange provided with studs and attached on the inner end of one of the sections, another flange with apertures and slidably mounted on the studs and attached on the inner end of the other section, lock nuts threadedly engaged on the studs for limiting the spaced relations of the flanges, and set screws with lock nuts threadedly passed through the first flange for urging said flanges into spaced relations as determined by the said lock nuts.

2. In a device of the class described, a piston rod consisting of two aligned sections, a flange provided with studs and attached on the inner end of one of the sections, another flange with apertures and slidably mounted on the studs and attached on the inner end of the other section, lock nuts threadedly engaged on the studs for limiting the spaced relations of the flanges and means for urging said flanges into spaced relations as determined by the said lock nuts.

In testimony whereof I have affixed my signature.

MANUEL FALCON TREVIÑO.